(12) United States Patent
Edelstein (10) Patent No.: US 7,656,159 B2
(45) Date of Patent: Feb. 2, 2010

(54) LOCATING STATIONARY MAGNETIC OBJECTS

(75) Inventor: Alan S. Edelstein, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 385 days.

(21) Appl. No.: 11/852,504

(22) Filed: Sep. 10, 2007

(65) Prior Publication Data

US 2009/0066321 A1    Mar. 12, 2009

(51) Int. Cl.
*G01V 3/08* (2006.01)
*G01R 33/12* (2006.01)

(52) U.S. Cl. .................. 324/326; 324/243; 324/260; 702/150

(58) Field of Classification Search ................. None
See application file for complete search history.

(56) References Cited

U.S. PATENT DOCUMENTS 5,134,369 A * 7/1992 Lo et al. .................. 324/245

6,675,123 B1   1/2004 Edelstein
2003/0011359 A1*  1/2003 Ashe .................. 324/207.17
2003/0011370 A1*  1/2003 Mercer .................. 324/326

* cited by examiner

*Primary Examiner*—Jay M Patidar
(74) *Attorney, Agent, or Firm*—Guy M. Miller (57) ABSTRACT

A technique for locating stationary magnetic objects comprises placing magnetic sensors on a movable platform; for each sensor, measuring a total magnetic field signal in an area of detection; using the sensors to identify a line upon which a target stationary magnetic object is located; and fixing a location of the object by moving the platform in substantially straight lines until the object is detected by at least two of the sensors; using the measured signals to determine a first path on which the object lies; positioning the sensors so that a line connecting two of the sensors intersects the first path on which the object lies; moving the platform along a second path substantially parallel to the first path; recording two positions at which at least two of the sensors detect a maximum total magnetic field signal from the object; and identifying a third path through the two positions.

20 Claims, 8 Drawing Sheets

LOCATING STATIONARY MAGNETIC OBJECTS

GOVERNMENT INTEREST

The embodiments described herein may be manufactured, used, and/or licensed by or for the United States Government without the payments of royalties thereon.

CROSS-REFERENCE TO RELATED APPLICATIONS

This application relates to co-pending U.S. patent application entitled "Locating Ferromagnetic Objects In A Single Pass" Ser. No. 11/852,484, filed concurrently herewith, the contents of which in its entirety is herein incorporated by reference.

BACKGROUND

1. Technical Field

The embodiments herein generally relate to magnetic sensing, and, more particularly, to locating magnetic objects.

2. Description of the Related Art

A system and method for tracking magnetic objects is described in U.S. Pat. No. 6,675,123 (hereinafter referred to as "the '123 patent"), the complete disclosure of which, in its entirety, is herein incorporated by reference. As the '123 patent describes, all types of land vehicles, ships, and aircraft have structural and power systems capable of generating substantial magnetic signatures. Even small objects may exhibit sufficient magnetization to be observed from a distance. These applications include covert handgun detection to protect buildings and their occupants; pinpointing unexploded ordnance at converted military bases; and locating the position and depth of underground pipes prior to construction activities. The ability to track magnetic objects is also crucially important in other areas, such as medicine. For example, controlling the orientation, forces, and/or motion of internally implanted devices.

A variety of magnetic sensor data processing algorithms, methods, systems and devices thereof capable of localizing, quantifying, and classifying objects based on their magnetic fields and magnetic signatures have been developed. Some conventional techniques detect, locate, and classify magnetic objects based on a large set of measurements distributed over space and/or time. Some conventional techniques involve using measurements of an object's magnetic dipole moment, or are based on electromagnetic anomaly detection technology, which senses an electromagnetic anomaly and pinpoints it as close to real time. Such a technique can measure how close a target is located to a sensor head, while locating the target or magnetic object in three dimensions and thereafter evaluating its orientation.

One of the problems associated with such conventional techniques for tracking magnetic objects is that they are generally based on the utilization of three components of a detected magnetic field. Typically, if measurements of the vector magnetic-field are made, great care must be taken to minimize rotational vibrations. However, because the earth's magnetic field is so large (i.e. on an order 50,000 nT), it is generally difficult to differentiate rotational vibrations from signals from an object.

Programs and methodologies based on such techniques typically require the inversion of a matrix and additionally require a relatively great deal of processing time. Such programs and methodologies also usually require obtaining measurements from several sensors simultaneously. In order to perform several measurements on nearby weak sources and to avoid rotational vibrations, the sensors should be placed close to one another on a rigid frame. If the sensors are configured in this manner, the difference between the signals from strong distant sources is generally small. Additionally, obtaining accurate measurements of these small differences requires expensive sensors and the use of gradiometer algorithms. Unfortunately, such techniques are generally time consuming and also inefficient. While the '123 patent provides a valuable technique for overcoming the problems of the conventional techniques for finding the track of magnetic objects, there remains a need for finding the position of the target as a function of time on the track of magnetic objects.

SUMMARY

In view of the foregoing, an embodiment herein provides a method for locating stationary magnetic objects in an area of detection and a program storage device readable by computer, tangibly embodying a program, of instructions executable by the computer to perform the method for locating stationary magnetic objects in an area of detection, wherein the method comprises placing a plurality of magnetic sensors arranged in an array on a movable and adjustable platform; for each of the plurality of magnetic sensors, measuring a total magnetic field signal in the area of detection; using the plurality of magnetic sensors to identify a line upon which a target stationary magnetic object is located within the area of detection; and fixing a location of the target stationary magnetic object, wherein the fixing process comprises: moving the platform over the area of detection in substantially straight lines until a target stationary magnetic object is detected by at least two of the plurality of magnetic sensors; using the measured total magnetic field signals to determine a first path on which the target stationary magnetic object lies; positioning the plurality of magnetic sensors so that a line connecting two of the plurality of magnetic sensors intersects the first path on which the target stationary magnetic object lies; moving the platform along a second path substantially parallel to the first path; recording two positions at which at least two of the plurality of magnetic sensors detect a maximum total magnetic field signal from the target stationary magnetic object; and identifying a third path through the two positions.

Preferably, the fixing process further comprises locating the target stationary magnetic object at an intersection of the first path and the third path. The plurality of magnetic sensors may comprise exactly three magnetic sensors. Alternatively, the plurality of magnetic sensors may comprise exactly four magnetic sensors. Moreover, the plurality of magnetic sensors may comprise any of a vector sensor and a total field magnetic sensor. Preferably, a position of the plurality of magnetic sensors is adjustable.

Another embodiment provides a system for locating stationary magnetic objects in an area of detection, wherein the system comprises a movable and adjustable platform comprising a plurality of magnetic sensors arranged in an array, wherein the array is adapted to move across the area of detection in straight line paths, and wherein each of the plurality of magnetic sensors comprises processing circuitry adapted to measure a total magnetic field signal in the area of detection; identify a line upon which a target stationary magnetic object is located within the area of detection; and fix a location of the target stationary magnetic object by moving the platform over the area of detection in substantially straight lines until a target stationary magnetic object is detected by at least two of the plurality of magnetic sensors; using the measured total magnetic field signals to determine a first path on which the target stationary magnetic object lies; positioning the plurality of magnetic sensors so that a line connecting two of the plurality of magnetic sensors intersects the first path on which the target stationary magnetic object lies; moving the platform along a second path substantially parallel to the first path; recording two positions at which at least two of the plurality of magnetic sensors detect a maximum total magnetic field signal from the target stationary magnetic object; and identifying a third path through the two positions.

The processing circuitry may be further adapted to locate the target stationary magnetic object at an intersection of the first path and the third path. Additionally, the plurality of magnetic sensors may comprise exactly three magnetic sensors. Alternatively, the plurality of magnetic sensors may comprise exactly four magnetic sensors. Furthermore, the plurality of magnetic sensors may comprise any of a vector sensor and a total field magnetic sensor. Preferably, a position of the plurality of magnetic sensors is adjustable.

Another embodiment provides a method of detecting stationary magnetic objects comprising supplying a stationary magnetic object in an area of detection; passing a single magnetic sensor past the stationary magnetic object in substantially straight line paths; recording geographic positions where a maximum total magnetic field signal is detected in the area of detection; locating a first line containing the stationary magnetic object; making two passes of the single magnetic sensor in two passing lines that are parallel to the first line, wherein the two passing lines and the first line are in a same geometric plane; recording positions where the magnetic sensor measures the maximum total magnetic field in the two passes; and connecting the recorded positions with a third line, wherein the connecting allows for the detection of the stationary magnetic object, and wherein the stationary magnetic object lies at an intersection of the first line and the third line.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for finding the position of the target as a function of time on the track of magnetic objects. The embodiments herein achieve this by providing an adjustable platform comprising magnetic sensors, a reference sensor, a method for tracking magnetic objects, and associated electronics. Referring now to the drawings, and more particularly to FIGS. 1 through 8, where similar reference characters denote corresponding features consistently throughout the figures, there are shown preferred embodiments.

Figure 1:
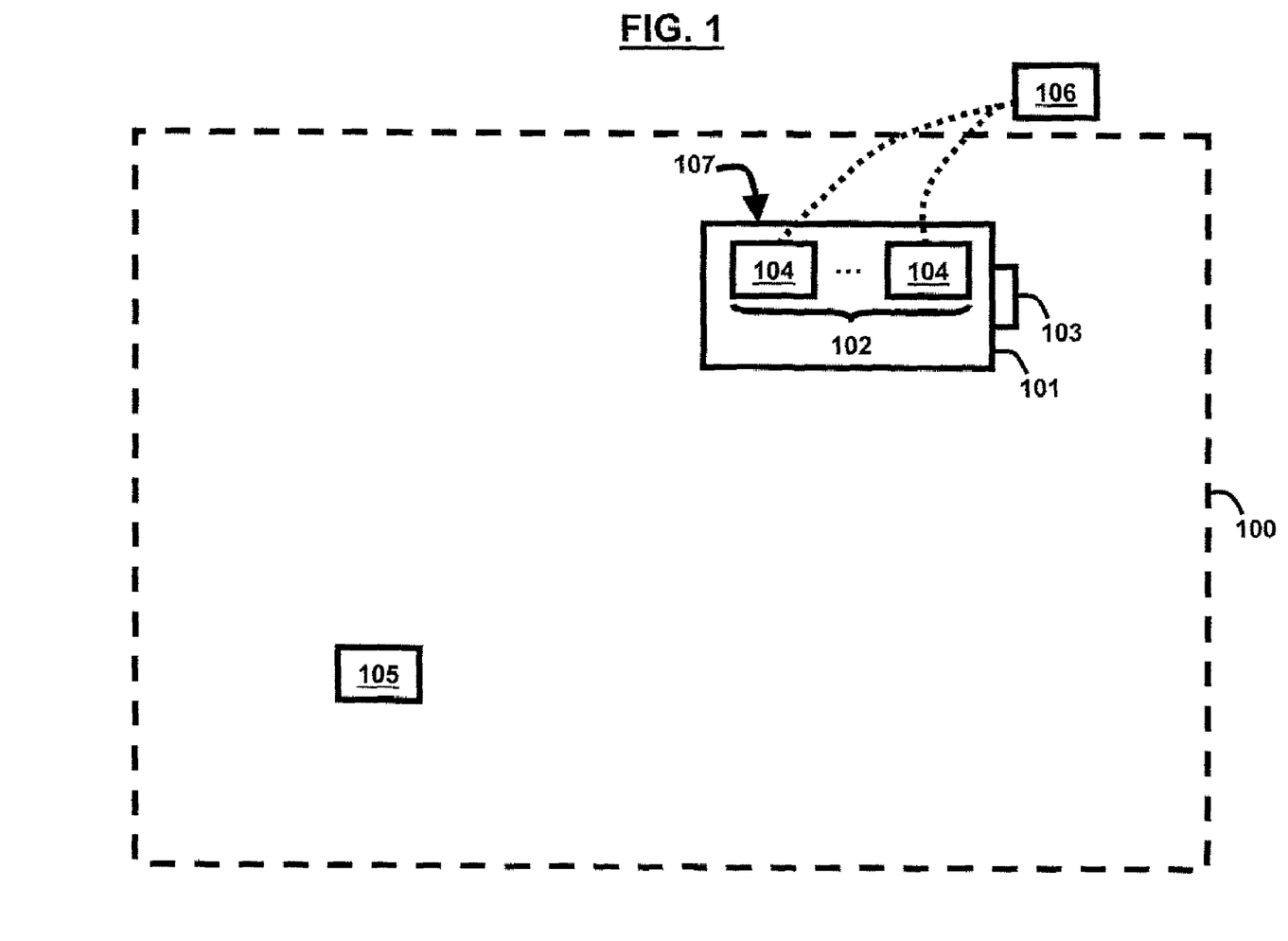
FIG. 1 is a schematic diagram illustrating a system according to an embodiment herein.
Figure 2:
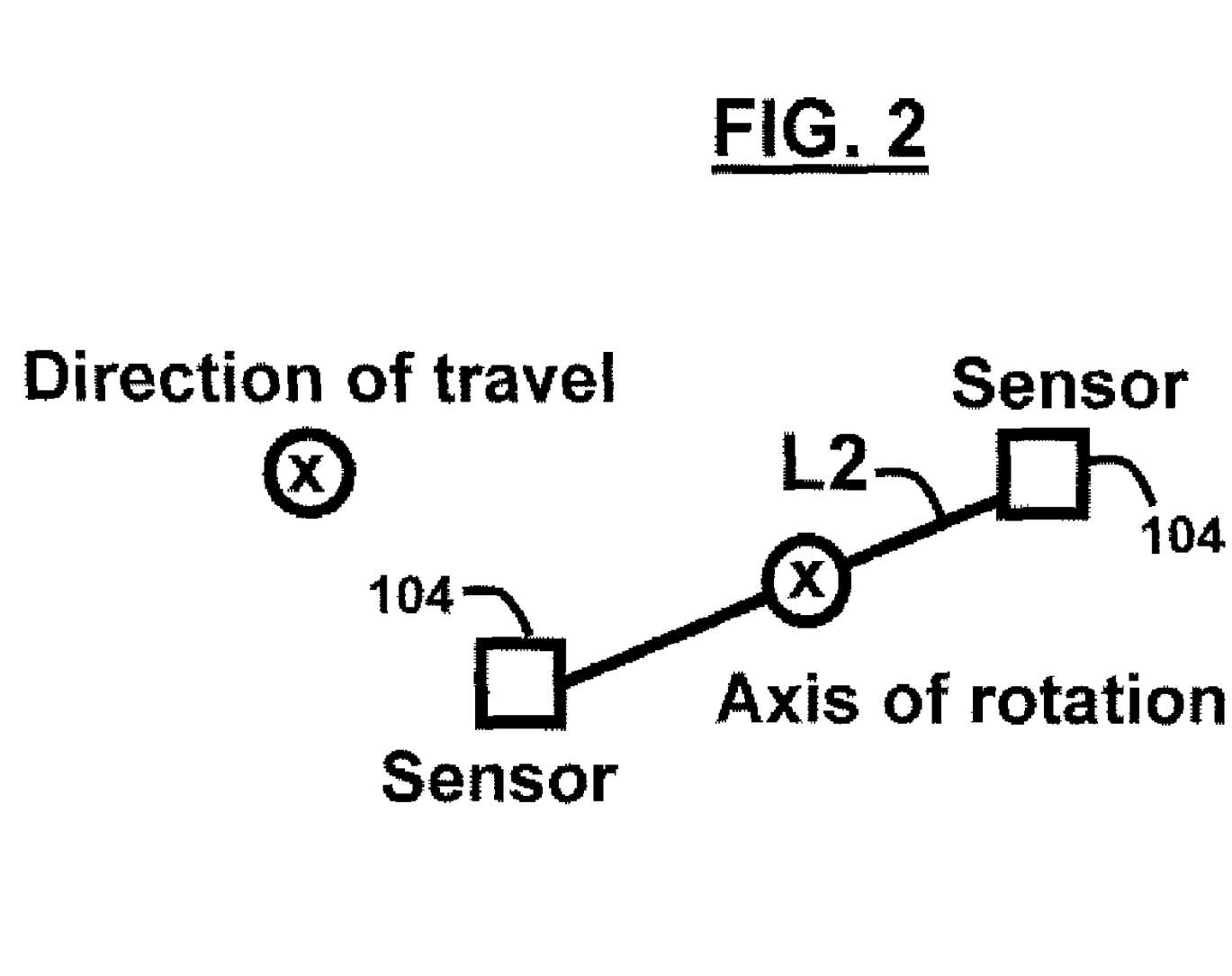
FIG. 2 illustrates a schematic diagram of a system according to an embodiment herein.
Figure 4A:
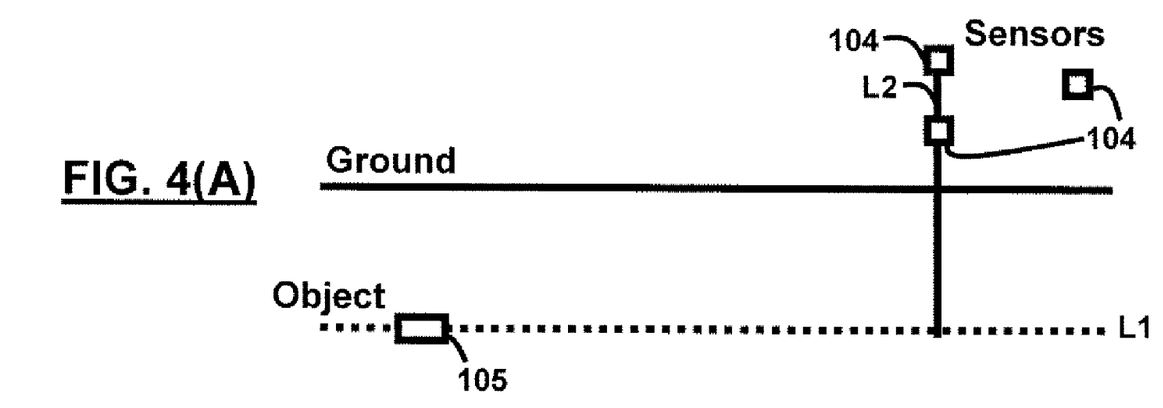
FIGS. 4(A) and 4(B) illustrate schematic diagrams of sensors in relation to an object to be detected according to an embodiment herein.
Figure 4B:
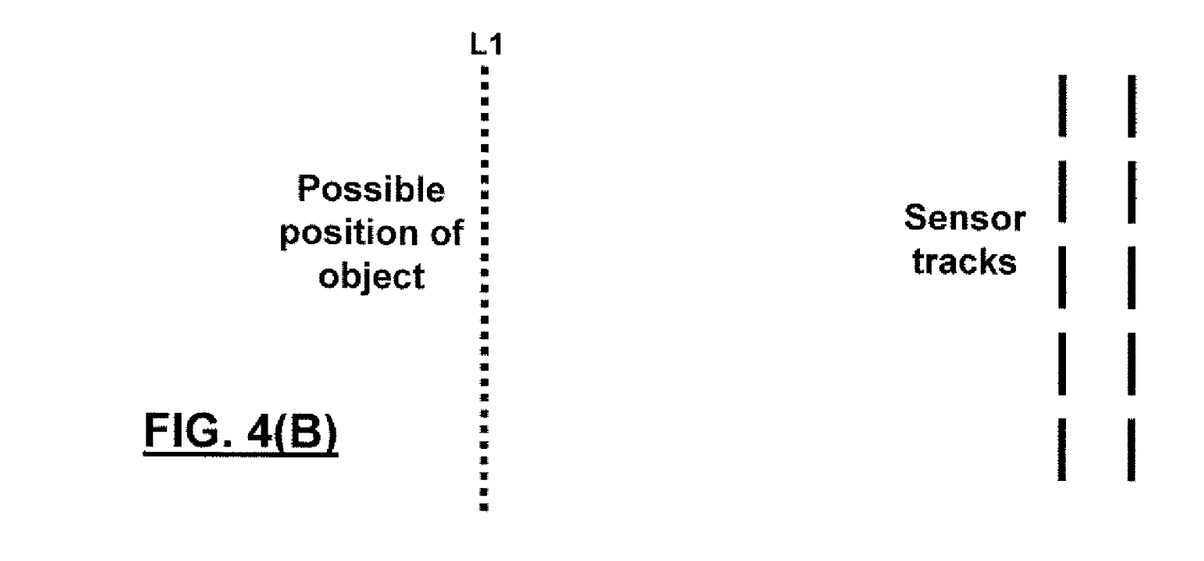
Figure 5:
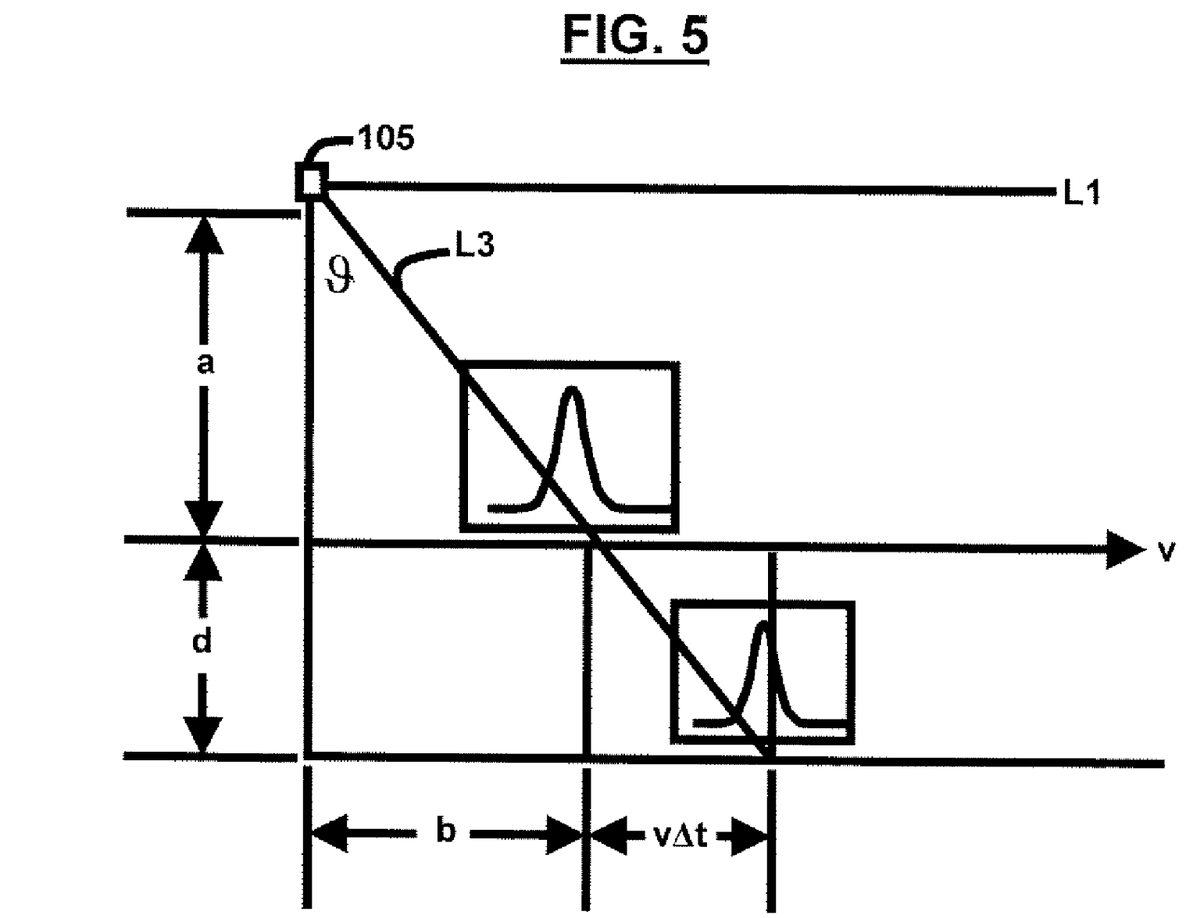
FIG. 5 illustrates a graphical representation of the plane containing the velocity and the line between the sensors and the object to be detected according to an embodiment herein.
Figure 6:
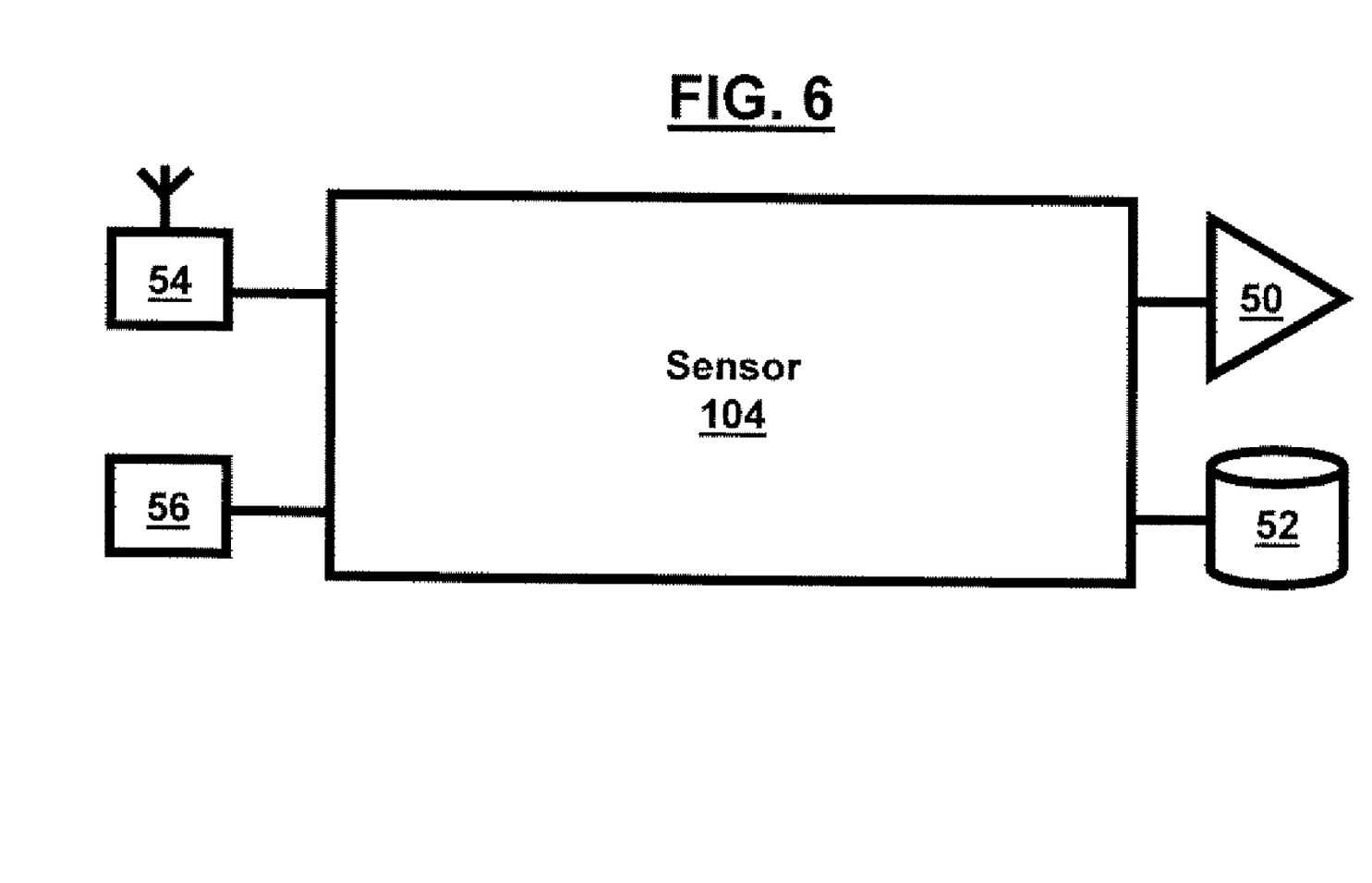
FIG. 6 illustrates a block diagram of electronics used in conjunction with the sensors of the system of FIGS. 1, 2, and 4(A) according to an embodiment herein.

FIG. 1, with reference to FIGS. 2, 5, and 6, illustrates a diagram of a system 107 for locating stationary magnetic objects 105 in an area of detection 100 according to an embodiment herein, wherein the system 107 comprises a movable and adjustable platform 101 comprising a plurality of magnetic sensors 104 arranged in an array 302, wherein the array 102 is adapted to move across the area of detection 300 in straight line paths, and wherein each of the plurality of magnetic sensors 104 comprises processing circuitry (for example, the amplifier 50, data storage device 52, equipment 54 for detecting positions, and processing device 56 of FIG. 6) adapted to measure a total magnetic field signal in the area of detection 100; identify a line upon which a target stationary magnetic object 105 is located within the area of detection 100; and fix a location of the target stationary magnetic object 105 by moving the platform 101 over the area of detection 100 in substantially straight lines until a target stationary magnetic object 105 is detected by at least two of the plurality of magnetic sensors 104; using the measured total magnetic field signals to determine a first path (L1) (illustrated in FIGS. 4(A) through 5) on which the target stationary magnetic object 105 lies (the first path (L1) may be determined using the approach described in the '123 patent); positioning the plurality of magnetic sensors 104 so that a line (L2) (illustrated in FIGS. 2 and 4(A)) connecting two of the plurality of magnetic sensors 104 intersects the first path (L1) on which the target stationary magnetic object 105 lies; moving the platform 101 along a second path substantially parallel to the first path (L1); recording two positions at which at least two of the plurality of magnetic sensors 104 detect a maximum total magnetic field signal from the target stationary magnetic object 105; and identifying a third path (L3) (illustrated in FIG. 5) through the two positions.

The processing circuitry (for example, the amplifier 50, data storage device 52, equipment 54 for detecting positions, and processing device 56 of FIG. 6) may be further adapted to locate the target stationary magnetic object 105 at an intersection of the first path (L1) and the third path (L3). Additionally, the plurality of magnetic sensors 104 may comprise exactly three magnetic sensors 104. Alternatively, the plurality of magnetic sensors 104 may comprise exactly four magnetic sensors 104. Furthermore, the plurality of magnetic sensors 304 may comprise any of a vector sensor and a total field magnetic sensor. Preferably, a position of the plurality of magnetic sensors 104 is adjustable.

Alternatively, by properly controlling the position, of a single sensor 104 and using multiple passes past the object 105, it is possible to also locate the target stationary magnetic object 105. In this embodiment, the method of detection comprises supplying a stationary magnetic object 105 in an area of detection 100; passing a single magnetic sensor 104 past the stationary magnetic object 105 in substantially straight line paths; recording geographic positions where a maximum total magnetic field signal is detected in the area of detection 100; locating a first line (L1) containing the stationary magnetic object 105; making two passes of the single magnetic sensor 104 in two passing lines that are parallel to the first line (L1), wherein the two passing lines and the first line (L1) are in the same geometric plane; recording positions where the magnetic sensor 104 measures the maximum total magnetic field in the two passes; and connecting the recorded positions with a third line (L3), wherein the connecting allows for the detection of the stationary magnetic object 105, and wherein the stationary magnetic object 105 lies at an intersection of the first line (L1) and the third line (L3).

As mentioned, one aspect of the embodiments herein includes an adjustable platform 101 that comprises magnetic sensors 104. Preferably, the adjustable platform 101 is either attached on a means for transporting 103 the adjustable platform 101, wherein the means for transporting 103 the adjustable platform 101 may include a vehicle (not shown), a boom (not shown) attached to a vehicle (not shown), or on wheels (not shown) so that the adjustable platform 101 can be pushed or pulled by a vehicle (not shown). Magnetic noise should preferably be minimized or compensated for, which can be accomplished by noise cancellation, propulsion design, and by separating the adjustable platform 101 from the vehicle (not shown) and associated electronics (for example, the amplifier 50, data storage device 52, equipment 54 for detecting positions, and processing device 56 of FIG. 6) located on the platform 101. Preferably, the system 107 comprises at least two sensors 104 and preferably three or more sensors 104. The sensors 104, which can be either vector or total field magnetic sensors, measure the total field. Total field magnetic sensors are preferred because they are insensitive to rotational vibrations. The position of at least two of the sensors 104 are adjustable so that they can rotate 360° around an axis parallel to the direction of motion as shown in FIG. 2.

Next, the embodiments herein utilize a reference sensor 106, which measures the total magnetic field. The readings from the reference sensor 106 are subtracted from the readings of the other sensors 104. By using a total field sensor 106 one typically uses a computer or some other data processing tool to subtract the readings of the total magnetic field of the reference sensor 106 at each instant of time from the total magnetic field readings of the other sensors 104. Performing this subtraction minimizes the effect of geomagnetic noise on the other sensors 104.

Figure 3:
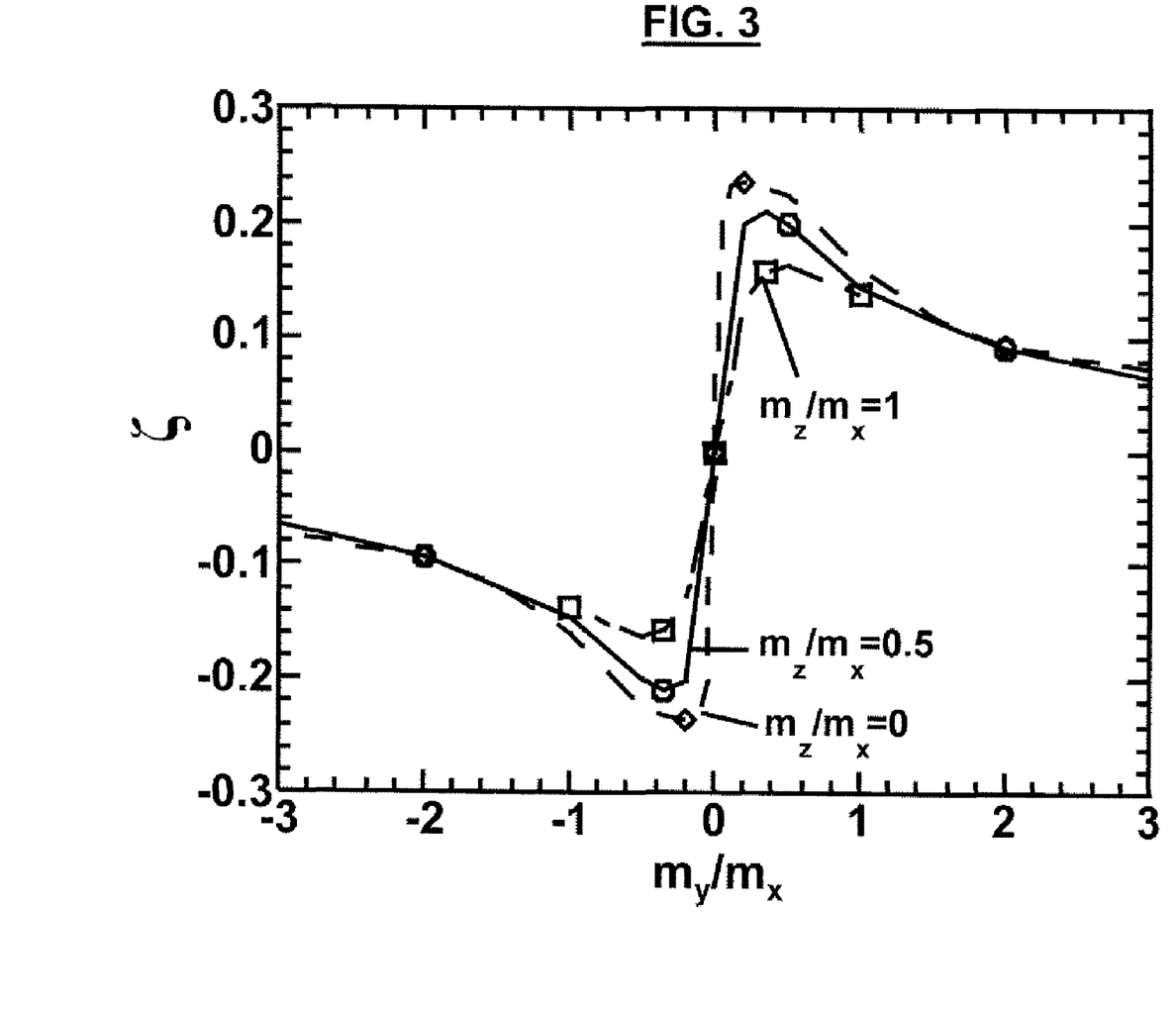
FIG. 3 illustrates a graphical representation of the position of the maximum total magnetic field as a function of the direction of the moment according to an embodiment herein.

The methodology for tracking magnetic objects given in the '123 patent uses the total magnetic field readings from three or more magnetic sensors and is used to determine the track of a magnetic object moving in a straight line. It was subsequently and unexpectedly discovered that this methodology is also successful in determining the magnetic track if the track is in a line even if the sensors and the target are not in a plane. The distance to the object should preferably be less than a few times the separation between the sensors. The methodology in the '123 patent assumes that the maximum total magnetic field occurred at the position of closest approach to the sensor. However, this does not always occur. FIG. 3 shows examples of how the position of the maximum total field depends on the direction of the magnetic moment. Here, the quantity $\zeta=x/y$, where x is the deviation along the path from the point of closest approach where the maximum total field occurs, and y is distance of closest approach. The object is moving in the x-y plane parallel to the x-axis. The ordinate shows the values of x/y at which the maximum total field occurs. As shown in FIG. 3, the assumption that the maximum total field occurs at the point of closest approach; i.e., at x= 0, is not always correct. Nevertheless, it turns out that even in these cases the predicted track by the '123 patent is very close to the actual track.

The embodiments herein further utilize a new magnetic tracking methodology. In this new case a stationary object 105 is being detected. Moreover, three or more sensors 104 are being moved by the adjustable platform 101. The previous methodology in the '123 patent works equally well if the sensor moves instead of the magnetic object. However, in this new case the direction of motion is known. Thus, there are two things to determine: the distance between the track and object 105 and the depth, the object 105 is buried. These parameters are determined using the previous methodology given in the '123 patent. After using this information, one positions (for example, rotates) two of the sensors 104 on the adjustable platform 101 so that they point to the line (L1) on which the object 105 lies as depicted in FIGS. 4(A) and 4(B).

FIG. 4(A) illustrates the sensors 104 lined up with the line (L1) on which the object 105 lies. FIG. 4(B) illustrates a top view of FIG. 4(A). The sensors 104 are moved past the target along the same path as before. The positions at which the two sensors 104 detect the maximum can be used to determine the exact position of the object 105.

The magnetic locating methodology provided by the embodiments herein includes:

1. Placing three or preferably four more sensors 104 on a movable platform 101 that may be attached to a means for transporting 103 the adjustable platform 101 such as a vehicle (not shown). The vehicle can be a ground or air vehicle. Each sensor 104 is adapted to measure the total magnetic field of the area of detection. The sensors 104 are arranged in an array and separated from one another by a distance of several feet, for example. The orientation of two of the sensors 104 should be sufficiently flexible such that the line (L2) joining two of the sensors 104 can be adjusted to point in different directions.

2. Moving the platform 101 and array of sensors 104 in substantially straight lines over the area of interest until the sensors 104 detect the magnetic object 105.

3. If necessary, adjusting the path to be closer to the object 105 so that the signal-to-noise ratio (SNR) is greater than approximately one and to apply a generalization of the magnetic tracking methodology of the '123 patent.

4. Using the total magnetic field signals and the generalization of the magnetic tracking methodology of the '123 patent to determine the line (L1) on which the magnetic object 105 lies. The generalization of the previous methodology of the '123 patent involves finding which calculated sensor reading based on trial tracks that are described by the distance between the track and object 105 and the depth the object 105 best reproduces the measured values.

5. Changing the position of the two sensors 104 so that the line (L2) joining the two sensors 104 intersects the line (L1). Moving the platform 101 along a path roughly parallel to the line (L1) and sufficiently close to line (L1) such that one can accurately determine the positions when each of the two sensors 104 detects a maximum, in the total field.

6. Recording the two positions at which the two sensors 104 detect the maximum total field from the object 105. Refer to the line through these two positions as the line (L3).

7. The magnetic object 105 is located at the intersection of the lines (L1) and (L3).

The plane containing the velocity and the line (L3) between the sensors 104 and the object 105 is illustrated in FIG. 5. The length a is the distance between the point of closest approach of the nearest sensor 104 to the object 105. The length b is the distance between the point of closest approach between the point of closest approach of the nearest sensor 104 to the object 105 and the position where the nearest sensor 104 detects the maximum total magnetic field. The length, d is the separation of the two sensors 104. Moreover, $\Delta t$ is the difference in time between when the two sensors 104 detect the maximum field and v is the velocity of the platform 101 holding the sensors 104. The positions at which each sensor 104 detects the maximum signal are also shown in FIG. 5.

The approach described herein circumvents the problem associated with the variation of the angle of the maximum field with direction of the moment. As shown in FIG. 3, the angular deviation from the position of closest approach only depends upon the direction of the magnetic moment of the object 105. Thus, if the extension of line (L2) connecting the sensors 104 intersects line (L1) on which the object 105 lies as in FIG. 4(A), then each of the two sensors 104 detects the maximum field at the same angular deviation from the point of closest approach. This result is depicted in FIG. 5. If the path of the sensors 104 is parallel to line (L1) and the line L2 is perpendicular to line (L1), then $b/a = v\Delta t/d$. Thus, the position of the magnetic object 305 can be determined.

The embodiments herein utilize suitable electronics and data processing to implement the methodology described above. In one embodiment, as shown in FIG. 6, the electronics are operatively connected to the sensors 104 (of FIG. 1), which may include an amplifier 50 to increase the amplitude of the signals from the sensors 104, a data storage device 52 to store the collected data, equipment 54 to determine the position of the sensors 104 when they detect the maximum total field (for example, a global positioning system (GPS) device), and a processing device 56. The processing device 56 is used first to apply the methodology or more explicitly to find the line (L1) that best reproduces the sensor readings. Second, the processing device 56 is used to compute the angle $\Theta$ (shown in FIG. 5), which is equal to $\tan^{-1} v\Delta t/d$. All of the electronics and data processing equipment are preferably located on the platform 101. Preferably, the reference sensor 106 should be sufficiently far away from the object 105 such that it receives a negligible signal from the object 105. It may be preferable to not have the reference sensor 106 on the platform 101 and to remotely transmit the signal from the reference sensor 106 to the platform 101.

Currently 20-100 pT total field sensors are common. This implies that one could detect the location of objects of interest that are currently observed at 5 feet with a signal of 100 nT at a much larger distance of 50 feet using the embodiments herein. Again, the sensors 104 used in accordance with the embodiments herein are total field sensors. Thus, the sensors 104 are insensitive to rotational vibrations that make it difficult to use vector sensors in applications with moving sensors. Generally, the embodiments herein are used to locate the position of stationary ferromagnetic objects 105, and locate the position of improvised explosive devices (IEDs). Moreover, the embodiments herein are insensitive to mechanical rotational vibrations and, thus, are well suited to being used on air and ground vehicles (not shown).

The embodiments herein may include both hardware and software elements. The embodiments implemented in software include, but is not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
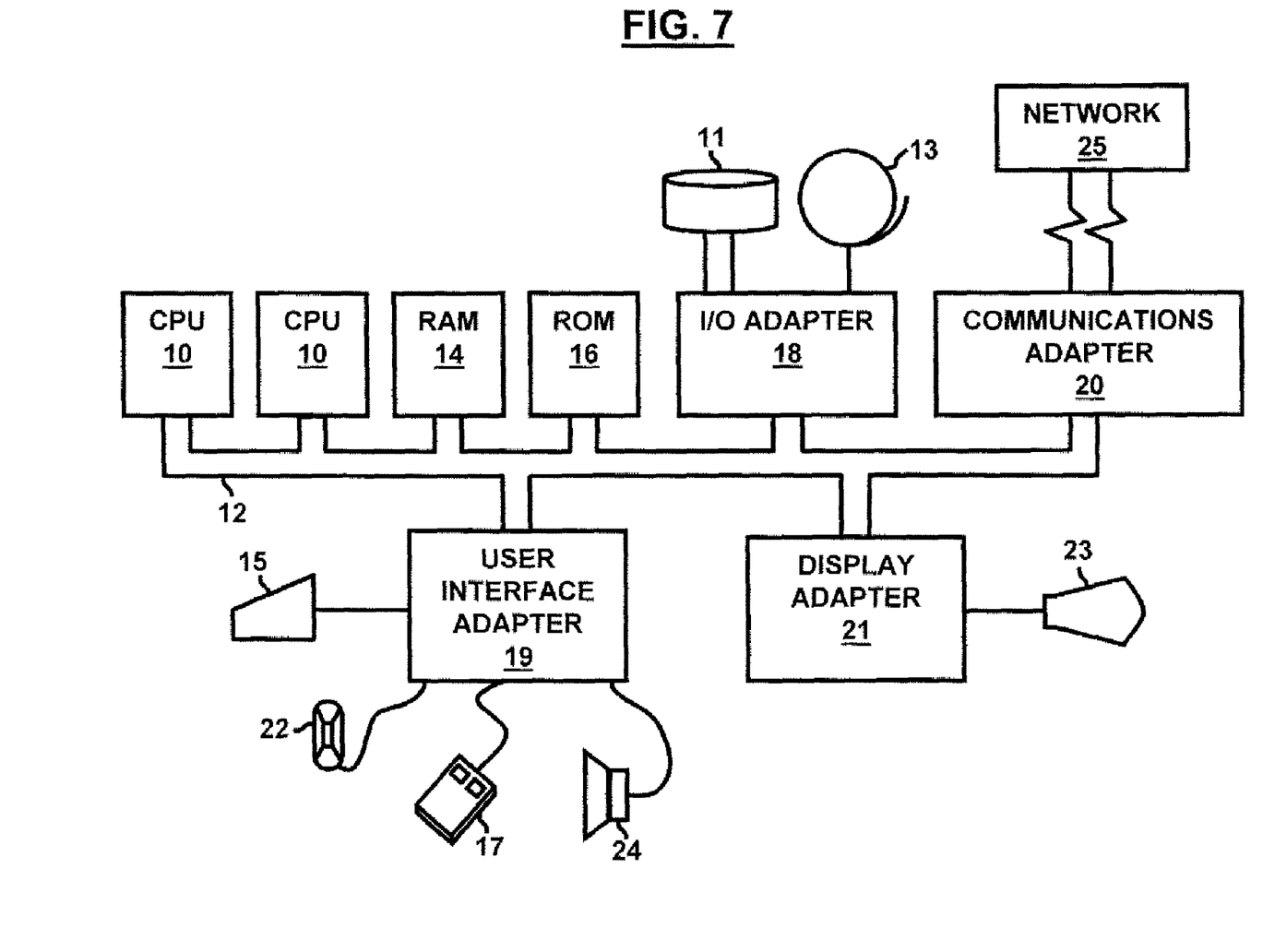
FIG. 7 illustrates a schematic diagram of a computer system according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communications adapter 20 connects the bus 12 to a data processing network 25, and a display adapter 21 connects the bus 12 to a display device 23 which may be embodied as an output device such as a monitor, printer, or transmitter, for example.

Figure 8:
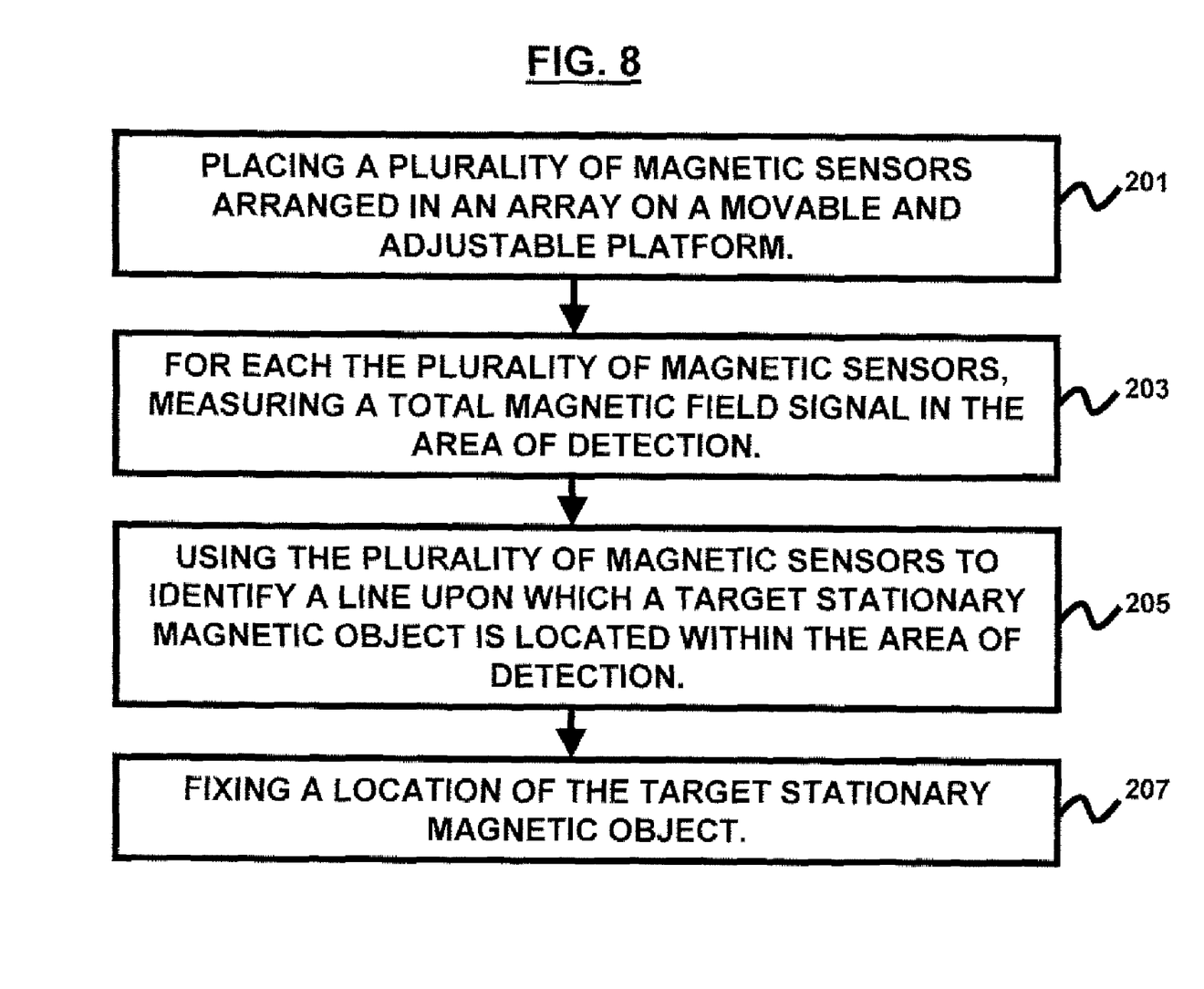
FIG. 8 is a flow diagram illustrating a preferred method according to an embodiment herein.

FIG. 8, with reference to FIGS. 1-7, is a flow diagram illustrating a method for locating stationary magnetic objects 105 in an area of detection 100 according to an embodiment herein, wherein the method comprises placing (201) a plurality of magnetic sensors 104 arranged in an array 102 on a movable and adjustable platform 101; for each of the plurality of magnetic sensors 104, measuring (203) a total magnetic field signal in the area of detection 100; using (205) the plurality of magnetic sensors 104 to identify a line upon which a target stationary magnetic object 105 is located within the area of detection 100; and fixing (207) a location of the target stationary magnetic object 105, wherein the fixing process (207) comprises: moving the platform 101 over the area of detection 100 in substantially straight lines until a target stationary magnetic object 105 is detected by at least two of the plurality of magnetic sensors 104; using the measured total magnetic field signals to determine a first path (L1) on which the target stationary magnetic object 105 lies; positioning the plurality of magnetic sensors 104 so that a line (L2) connecting two of the plurality of magnetic sensors 104 intersects the first path (L1) on which the target stationary magnetic object 105 lies; moving the platform 101 along a second path substantially parallel to the first path (L1); recording two positions at which at least two of the plurality of magnetic sensors 104 detect a maximum total magnetic field signal from the target stationary magnetic object 105; and identifying a third path (L3) through the two positions.

Preferably, the fixing process (207) further comprises locating the target stationary magnetic object 105 at an intersection of the first path (L1) and the third path (L3). The plurality of magnetic sensors 104 may comprise exactly three magnetic sensors 104. Alternatively, the plurality of magnetic sensors 104 may comprise exactly four magnetic sensors 104. Moreover, the plurality of magnetic sensors 104 may comprise any of a vector sensor and a total field magnetic sensor. Preferably, a position of the plurality of magnetic sensors 104 is adjustable.

The embodiments herein can achieve a significant benefit by locating stationary ferromagnetic objects 105 such as mines, IEDs, etc. from a moving vehicle. The object 105 to be sensed can be buried below, or located at or above the surface. According to the embodiments herein, sensors 104 are arranged on a moving platform 101 (either ground or air based). The data from the array of sensors 104 and the generalization of the '123 patent is used to determine a line (L3) upon which a target magnetic object 105 is located. The platform 101 is adapted to allow a second pass making additional "readings" to specifically fix the location of the target using the methodology provided by the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for locating stationary magnetic objects in an area of detection, said method comprising:
   placing a plurality of magnetic sensors arranged in an array on a movable and adjustable platform;
   for each said plurality of magnetic sensors, measuring a total magnetic field signal in said area of detection;
   using said plurality of magnetic sensors to identify a line upon which a target stationary magnetic object is located within said area of detection; and
   fixing a location of said target stationary magnetic object, wherein the fixing process comprises:
      moving said platform over said area of detection in substantially straight lines until a target stationary magnetic object is detected by at least two of said plurality of magnetic sensors;
      using the measured total magnetic field signals to determine a first path on which said target stationary magnetic object lies;
      positioning said plurality of magnetic sensors so that a line connecting two of said plurality of magnetic sensors intersects said first path on which said target stationary magnetic object lies;
      moving said platform along a second path substantially parallel to said first path;
      recording two positions at which at least two of said plurality of magnetic sensors detect a maximum total magnetic field signal from said target stationary magnetic object; and
      identifying a third path through said two positions.

2. The method of claim 1, wherein said fixing process further comprises locating said target stationary magnetic object at an intersection of said first path and said third path.

3. The method of claim 1, wherein said plurality of magnetic sensors comprises exactly three magnetic sensors.

4. The method of claim 1, wherein said plurality of magnetic sensors comprises exactly four magnetic sensors.

5. The method of claim 1, wherein said plurality of magnetic sensors comprise any of a vector sensor and a total field magnetic sensor.

6. The method of claim 1, wherein a position of said plurality of magnetic sensors is adjustable.

7. A program storage device readable by computer, tangibly embodying a program of instructions executable by the computer to perform a method for locating stationary magnetic objects in an area of detection, said method comprising:
   placing a plurality of magnetic sensors arranged in an array on a movable and adjustable platform;
   for each said plurality of magnetic sensors, measuring a total magnetic field signal in said area of detection;
   using said plurality of magnetic sensors to identify a line upon which a target stationary magnetic object is located within said area of detection; and
   fixing a location of said target stationary magnetic object, wherein the fixing process comprises:
      moving said platform over said area of detection in substantially straight lines until a target stationary magnetic object is detected by at least two of said plurality of magnetic sensors;
      using the measured total magnetic field signals to determine a first path on which said target stationary magnetic object lies;
      positioning said plurality of magnetic sensors so that a line connecting two of said plurality of magnetic sensors intersects said first path on which said target stationary magnetic object lies;

moving said platform along a second path substantially parallel to said first path;

recording two positions at which at least two of said plurality of magnetic sensors detect a maximum total magnetic field signal from said target stationary magnetic object; and identifying a third path through said two positions.

8. The program storage device of claim 7, wherein in said method, said fixing process further comprises locating said target stationary magnetic object at an intersection of said first path and said third path.

9. The program storage device of claim 7, wherein said plurality of magnetic sensors comprises exactly three magnetic sensors.

10. The program storage device of claim 7, wherein said plurality of magnetic sensors comprises exactly four magnetic sensors.

11. The program storage device of claim 7, wherein said plurality of magnetic sensors comprise any of a vector sensor and a total field magnetic sensor.

12. The program storage device of claim 7, wherein a position of said plurality of magnetic sensors is adjustable.

13. A system for locating stationary magnetic objects in an area of detection, said system comprising a movable and adjustable platform comprising a plurality of magnetic sensors arranged in an array, wherein said array is adapted to move across said area of detection in straight line paths, and wherein each said plurality of magnetic sensors comprises processing circuitry adapted to:

measure a total magnetic field signal in said area of detection;

identify a line upon which a target stationary magnetic object is located within said area of detection; and fix a location of said target stationary magnetic object by:

moving said platform over said area of detection in substantially straight lines until a target stationary magnetic object is detected by at least two of said plurality of magnetic sensors;

using the measured total magnetic field signals to determine a first path on which said target stationary magnetic object lies;

positioning said plurality of magnetic sensors so that a line connecting two of said plurality of magnetic sensors intersects said first path on which said target stationary magnetic object lies;

moving said platform along a second path substantially parallel to said first path;

recording two positions at which at least two of said plurality of magnetic sensors detect a maximum total magnetic field signal from said target stationary magnetic object; and identifying a third path through said two positions.

14. The system of claim 13, wherein said processing circuitry is further adapted to locate said target stationary magnetic object at an intersection of said first path and said third path.

15. The system of claim 13, wherein said plurality of magnetic sensors comprises exactly three magnetic sensors.

16. The system of claim 13, wherein said plurality of magnetic sensors comprises exactly four magnetic sensors.

17. The system of claim 13, wherein said plurality of magnetic sensors comprise any of a vector sensor and a total field magnetic sensor.

18. The system of claim 13, wherein a position of said plurality of magnetic sensors is adjustable.

19. A method of detecting stationary magnetic objects, said method comprising:

supplying a stationary magnetic object in an area of detection;

passing a single magnetic sensor past said stationary magnetic object in substantially straight line paths;

recording geographic positions where a maximum total magnetic field signal is detected in said area of detection;

locating a first line containing said stationary magnetic object;

making two passes of said single magnetic sensor in two passing lines that are parallel to said first line, wherein said two passing lines and said first line are in a same geometric plane;

recording positions where said magnetic sensor measures said maximum total magnetic field in the two passes; and connecting the recorded positions with a third line, wherein the connecting allows for the detection of said stationary magnetic object.

20. The method of claim 19, wherein said stationary magnetic object lies at an intersection of said first line and said third line.

* * * * *